United States Patent
Holtz et al.

(10) Patent No.: US 7,752,021 B2
(45) Date of Patent: Jul. 6, 2010

(54) MODEL-BASED TORQUE CONVERTER CONTROL

(75) Inventors: Vincent Holtz, Rosheim (FR); Maxence De Dreuille, Strasbourg (FR); Marc Rambert, Strasbourg (FR)

(73) Assignee: GM Global Technology Operations, Inc.

( * ) Notice: Subject to any disclaimer, the term of this patent is extended or adjusted under 35 U.S.C. 154(b) by 978 days.

(21) Appl. No.: 11/515,519

(22) Filed: Sep. 1, 2006

(65) Prior Publication Data

US 2008/0126043 A1 May 29, 2008

(51) Int. Cl.
*G06F 7/00* (2006.01)
*G06F 17/00* (2006.01)

(52) U.S. Cl. .................. 703/6; 703/7; 701/67

(58) Field of Classification Search .................. 703/6, 703/7; 701/51, 67, 84, 87, 90
See application file for complete search history.

(56) References Cited

U.S. PATENT DOCUMENTS

| | | | | |
|---|---|---|---|---|
| 5,545,957 | A * | 8/1996 | Kubo et al. | 318/432 |
| 5,627,750 | A * | 5/1997 | Kono et al. | 701/67 |
| 5,693,878 | A * | 12/1997 | Giles | 73/115.02 |
| 5,749,061 | A * | 5/1998 | Kono et al. | 701/68 |
| 6,052,640 | A * | 4/2000 | Wu | 701/67 |
| 6,217,481 | B1 * | 4/2001 | Watanabe et al. | 477/169 |
| 6,304,835 | B1 * | 10/2001 | Hiramatsu et al. | 703/7 |
| 6,652,415 | B2 * | 11/2003 | Segawa et al. | 477/62 |
| 6,754,603 | B2 * | 6/2004 | Turbett et al. | 702/113 |
| 6,928,357 | B2 * | 8/2005 | Higashimata et al. | 701/87 |
| 2002/0029136 | A1 * | 3/2002 | Hagiwara et al. | 703/8 |
| 2003/0115037 | A1 * | 6/2003 | Sumida | 703/22 |
| 2004/0111203 | A1 * | 6/2004 | Higashimata et al. | 701/51 |

OTHER PUBLICATIONS

Dennis Assanis, Zoran Filipi, Steve Gravante, Dan Grohnke, Xinqun Gui, Loucas Louca, Geoff Rideout, Jeffery Stein, Yongsheng Wang, Validation and Use of SIMULINK Integrated, High Fidelity, Engine-In-Vehicle Simulation of the International Class VI Truck, SAE 2000 World Congress, Detroit Michigan, Mar. 6-9, 2000, 18 pages.*

Hilding Elmqvist, Sven Erik Mattson, Hans Olsson, Johan Andreasson, Martin Otter, Christain Schweiger, Dag Bruck, Realtime Simulation of Detailed Vehicle and Powertrain Dynamics, 2004 SAE International, 13 pages.*

Keum-Shik Hong, Kyung-Jinn Yang, "An Object-Oriented Modular Simulation Model for Integrated Gasoline Engine and Automatci Transmission Control", Proceedings of the $7^{th}$ Mediterranean Conference on Control and Automation (MED99) Haifa Israel, Jun. 28-30, 1999. pp. 234-254.*

Pelchen C., Schweiger C., Otter M. "Modeling and Simulating the Efficiency of Gearboxes and Planetary Gearboxes", $2^{nd}$ International Modelica Conference, Proceedings, pp. 257-266. Mar. 18-19, 2002.*

* cited by examiner

*Primary Examiner*—Dwin M Craig

(57) ABSTRACT

A method of controlling hydraulic pressure to a torque converter is provided. The method includes: determining a slip error from a target slip value and a measured slip; integrating said slip error; determining a state space feedback control matrix for said measured slip; determining a state space feedback control matrix for said integrated slip error; and controlling pressure based on said state space feedback control matrix for said measured slip and said state space feedback control matrix for said integrated slip error.

13 Claims, 7 Drawing Sheets

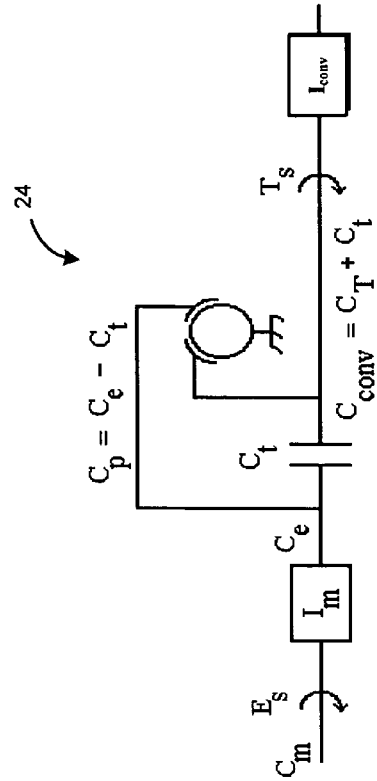
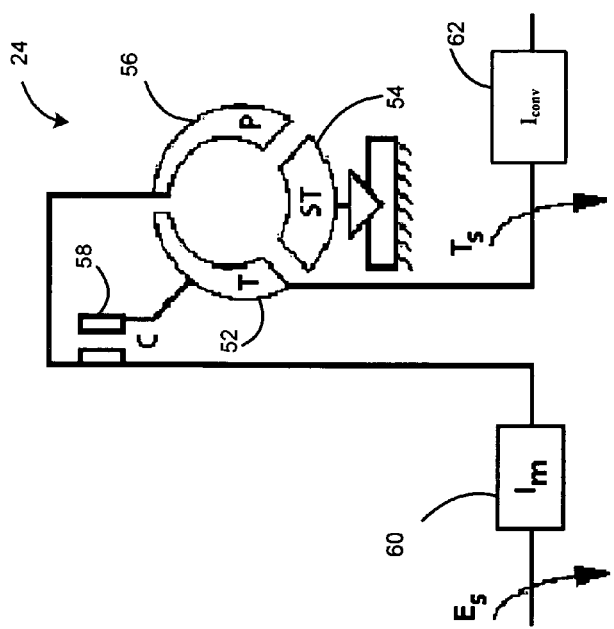
FIGURE 3B
FIGURE 3A

Forces : $\dot{p}_{13}, \dot{p}_{23}, \dot{p}_{42}, \dot{p}_{57}$

Speeds : $\dot{q}_{12}, \dot{q}_{43}, \dot{q}_{56}$

Flows : $\dot{q}_4, \dot{q}_{16}, \dot{q}_{26}, \dot{q}_{39}, \dot{q}_{48}, \dot{q}_{52}$ $$\begin{Bmatrix} \dot{p}_{13} \\ \dot{p}_{23} \\ \dot{p}_{42} \\ \dot{p}_{57} \\ \dot{q}_{12} \\ \dot{q}_{43} \\ \dot{q}_{56} \\ \dot{q}_4 \\ \dot{q}_{16} \\ \dot{q}_{26} \\ \dot{q}_{39} \\ \dot{q}_{48} \\ \dot{q}_{52} \end{Bmatrix} = A \cdot \begin{Bmatrix} p_{13} \\ p_{23} \\ p_{42} \\ p_{57} \\ q_{12} \\ q_{43} \\ q_{56} \\ q_4 \\ q_{16} \\ q_{26} \\ q_{39} \\ q_{48} \\ q_{52} \end{Bmatrix} + \begin{Bmatrix} A_{reg} & 0 & -F_0 \\ 0 & 0 & 0 \\ A_{tcc} & 0 & -F_1 \\ 0 & 0 & -F_3 \\ 0 & 0 & 0 \\ 0 & 0 & 0 \\ 0 & 0 & 0 \\ 0 & R & 0 \\ 0 & 0 & 0 \\ 0 & 0 & 0 \\ 0 & 0 & 0 \\ 0 & 0 & 0 \\ 0 & R_{13} & 0 \end{Bmatrix} \begin{Bmatrix} P_{tcc} \\ P_{drive} \\ 1 \end{Bmatrix}$$

*FIGURE 6*

MODEL-BASED TORQUE CONVERTER CONTROL

FIELD

The present invention relates to control systems and methods for torque converters.

BACKGROUND

The term "road-to-lab-to-math" describes the effort to reduce the amount of on-road testing and replace it with laboratory testing of components and subsystems. Road-to-lab-to-math simulates the functionality of vehicle component on a computer. The simulation uses mathematical models that make evaluation more precise and more representative of in-use conditions.

Alternatively, on-road testing of prototype vehicles can be very expensive; not only because of the costs of the vehicles themselves, but also because they comprise many prototype subsystems. Should one of these subsystems fail, the other subsystems cannot be tested without it. By bringing these subsystems and components to the laboratory, this interdependence of available hardware is eliminated. For example, it is now possible to evaluate a prototype transmission without a prototype engine being attached to it, so engine problems need not affect the transmission test schedule. Alternatively, it is also possible to verify the prototype transmission for compatibility with engines that may not yet be prototyped or even fully designed. Once the prototype is verified in the lab, it can be integrated into the vehicle.

SUMMARY

Accordingly, a method of controlling hydraulic pressure to a torque converter is provided. The method includes: determining a slip error from a target slip value and a measured slip; integrating said slip error; determining a state space feedback control matrix for said measured slip; determining a state space feedback control matrix for said integrated slip error; and controlling pressure based on said state space feedback control matrix for said measured slip and said state space feedback control matrix for said integrated slip error.

In other features, a torque converter control simulation system is provided. The system includes a controller model including: a converter control module that integrates a slip error and determines an apply pressure value and a release pressure value based on state space feedback control including said integrated slip error and received signals including an engine torque signal, an engine speed signal, a turbine speed signal, a target slip signal and a measured slip signal; and a hydraulic control module that determines a pressure signal based on said apply pressure and said release pressure. The system also includes a plant model including: a hydraulic module that simulates a hydraulic flow of a solenoid and a valve based on a state space representation of the solenoid and the valve; and a mechanical module that simulates the mechanical functions of a torque converter based on torque relationships within the torque converter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3A is a diagram illustrating a mechanical system of the torque converter control system;

FIG. 3B is a diagram illustrating a torque relationships within the mechanical system of the torque converter control system;

FIG. 6 is a state space representation of the hydraulic system; and

DETAILED DESCRIPTION

Figure 1:
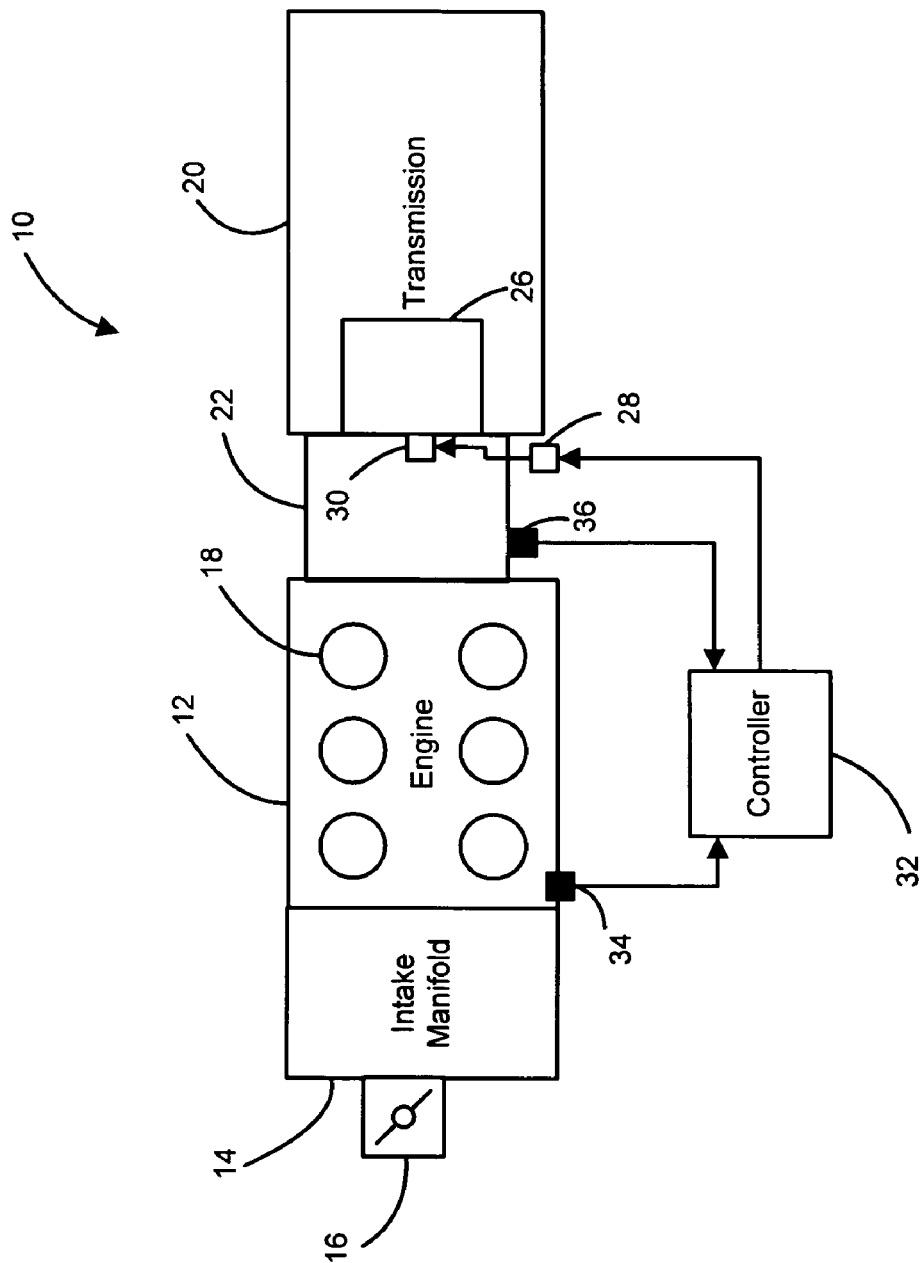
FIG. 1 is a functional block diagram illustrating a vehicle including a torque converter system.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, before determining a mathematical model of a particular vehicle component, it is necessary to understand its function in the vehicle and its interaction with other components. FIG. 1 illustrates a vehicle 10 that includes a conventional torque converter system. An engine 12 combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although six cylinders 18 are illustrated, it can be appreciated that the engine can have a plurality of cylinders including, but not limited to, 2, 3, 5, 6, 8, 10, 12 and 16 cylinders.

Torque from the engine 12 is supplied to a transmission 20 through a torque converter (TC) system shown generally at 22. The TC system 22 includes a torque converter 24, a hydraulic pump 26, a solenoid 28, and a valve 30. The hydraulic pump 26 is driven by the engine 12 to selectively supply pressurized fluid to the torque converter 24 through the solenoid 28 and the valve 30. A duty cycle is commanded by a controller 32 to the solenoid 28 that controls the valve 30 in order to vary the supply of pressurized fluid to the torque converter 24. A slip rate of the torque converter 24 is varied based on control of the pressurized fluid.

The controller 32 determines the duty cycle based on inputs received from the torque converter 24, the engine 12, the transmission 20, and/or other control modules within the controller 32. The inputs include: an engine speed signal received from and engine speed sensor 34 or determined by an engine speed control module; a turbine speed signal received from an turbine speed sensor 36 or determined by a turbine speed control module; an engine torque signal determined by an engine torque control module; and a slip signal determined from a slip module.

Figure 2:
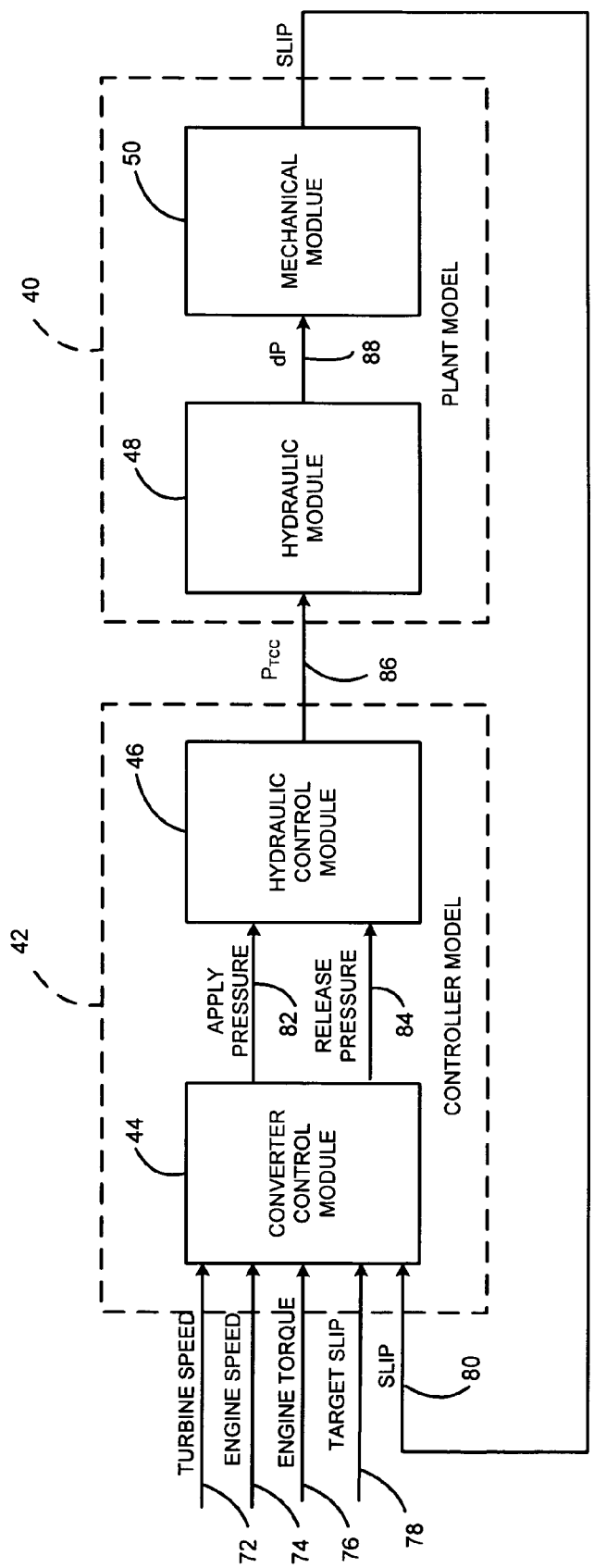
FIG. 2 is a block diagram illustrating a torque converter control system.

In order to mathematically model the torque converter control system a controller model and a plant model are developed. The controller model simulates the method of controlling the torque converter. The plant model simulates the torque converter as it is mechanically functioning. In an exemplary embodiment, the torque converter system can be broken down into two sub-systems, a hydraulic system and a mechanical system. The hydraulic system includes the solenoid 28 and the valve 30. The mechanical system includes the torque converter 24. A plant model 40 and a controller model 42 can be defined for each sub-system. In FIG. 2, the controller model 42 includes a converter control module 44 and a hydraulic control module 46. The plant model 40 includes a hydraulic module 48 and a mechanical module 50.

Referring now to FIGS. 3A and 3B. FIG. 3A illustrates the physical characteristics of the mechanical system in more detail. A torque converter 24 consists of three elements a turbine 52, a stator 54, and a pump 56. The pump (P) 56 is the input (drive) member. The pump 56 receives power from the engine. The turbine (T) 52 is the output (driven) member. The turbine 52 is connected to the transmission 20 (FIG. 1). The stator (ST) 54 assembly is the reaction member or torque multiplier. The stator (ST) 54 is supported on a one way clutch (C) 58 also referred to as the torque converter clutch (TCC), which operates as an overrunning clutch and permits the stator 54 to rotate freely in one direction and lock in the opposite direction. Engine inertia ($I_m$) is 60 supplied to the torque converter 24. Torque converter inertia ($I_{conv}$) 62 is supplied to the transmission 20 (FIG. 1). The rotational speed of the engine 12 (FIG. 1) is represented by $E_S$. The rotational speed of the turbine 52 is represented by $T_S$.

FIG. 3B illustrates the torque relationships between the elements of the torque converter 24. Based on the torque relationships, the mechanical system can be modeled mathematically by the following two equations:

$$I_m \cdot \frac{dE_S}{dt} = C_m - C_p - C_t \tag{1}$$

and $$I_{conv} \cdot \frac{dT_S}{dt} = C_t + C_T. \tag{2}$$

Where $C_m$ represents Engine torque and $C_e$ represents input torque. $C_t$ represents torque transmitted to the wheels by the TCC. $C_p$ represents pump torque and $C_T$ represents turbine torque. Equations 1 and 2 can be used by the mechanical module 50 (FIG. 2) to model the torque converter mechanical system.

Figure 4:
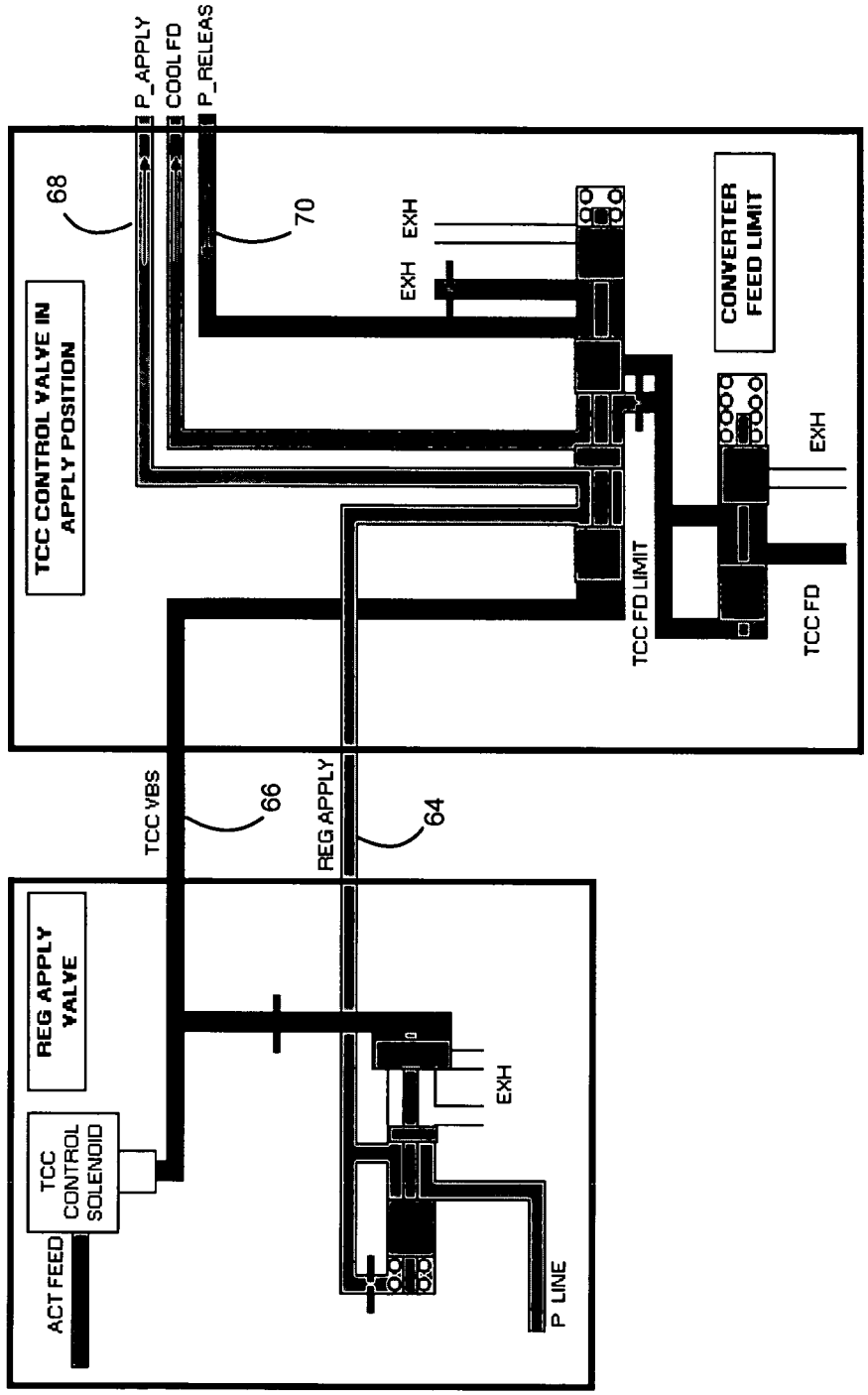
FIG. 4 is a diagram illustrating a hydraulic system of the torque converter control system.
Figure 5:
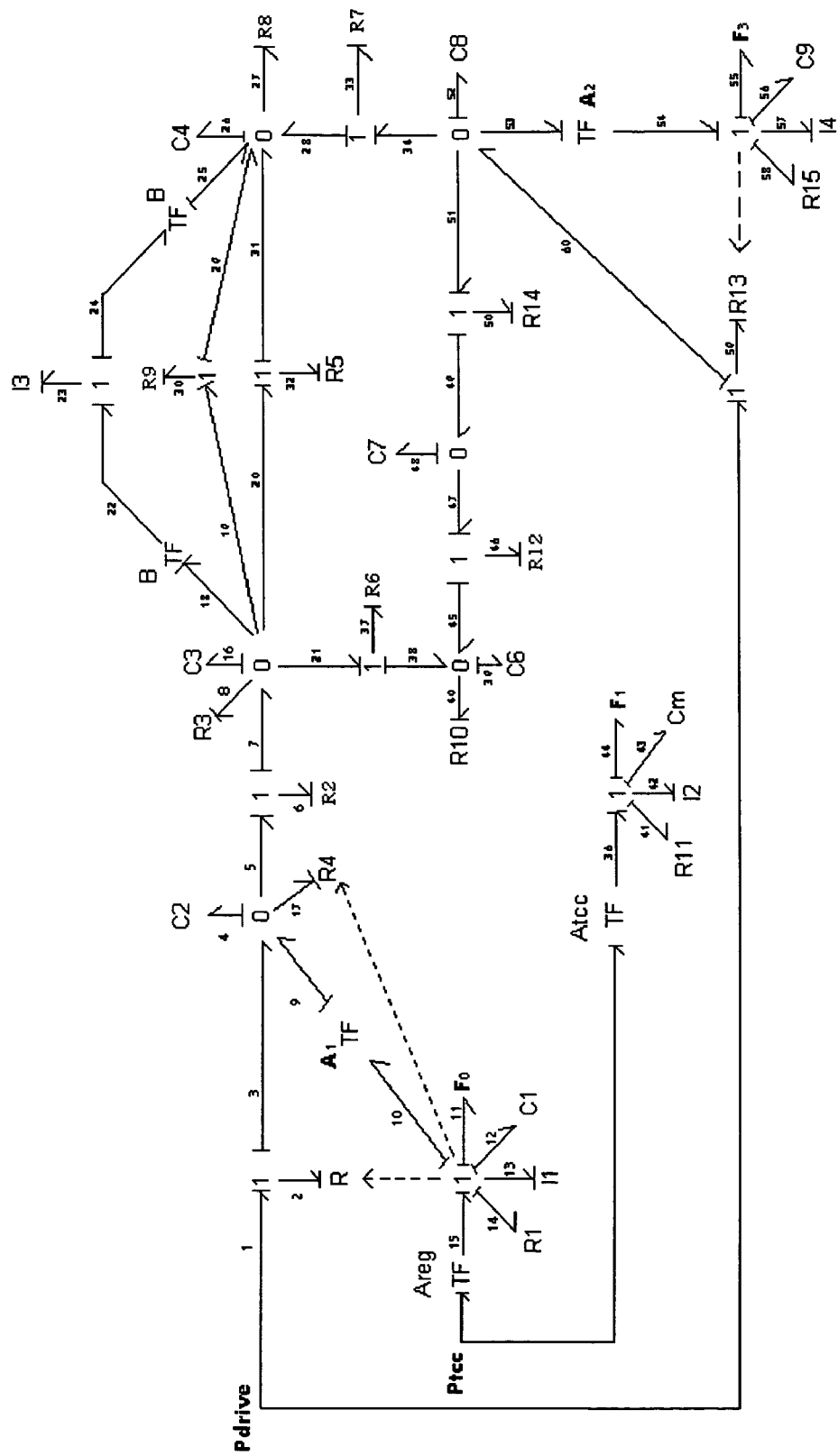
FIG. 5 is a bond graph of the hydraulic system.

Referring now to FIG. 4, the flow of the hydraulic system is shown in more detail. The mechanical system is commanded by the hydraulic system through the TCC. Apply and release pressure ($P_{apply}$ and $P_{release}$) are commanded by a regular apply signal (Reg_Apply) 64 and a TCC solenoid signal (TCC_VBS) 66. $P_{apply}$ 68 and $P_{release}$ 70 drive the TCC and create an amount of slippage through the fluid coupling. Based on a bond graph of the hydraulic system shown in FIG. 5 and a state space representation shown in FIG. 6, an input/output equation representing the hydraulic system can be:

$$\dot{x} = A.x + B.u$$

$$y = C.x \tag{3}$$

Where x represents a system state vector, u represents an input vector, and y represents an output vector. Equation 3 is used by the hydraulic module 48 (FIG. 2) to model the hydraulic system.

Referring back to FIG. 2, control methods are provided by the converter control module 44 and the hydraulic control module 46 in order to regulate slip, where slip equals engine speed minus turbine speed:

$$\text{Slip} = E_S - T_S. \tag{4}$$

Regulating slip provides a more efficient transfer of engine torque to the transmission 20 (FIG. 1). The converter control module 44 receives a turbine speed signal 72, an engine speed signal 74, an engine torque signal 76, a target slip signal 78 and a measured slip signal 80 as input. Based on the inputs 72-80, the converter control module 44 computes $P_{apply}$ 82 and $P_{release}$ 84 pressure in an attempt to eliminate the error between the measured slip and the target slip. The hydraulic control module 46 determines an appropriate TCC pressure signal 86 from the difference between $P_{apply}$ 82 and $P_{release}$ 84 pressure.

More specifically, the hydraulic control module 46 calculates the commanded TCC pressure $P_{Tcc}$ 86 from a hydraulic filter. The hydraulic filter takes into account the state space representation of the hydraulic system (FIG. 6) and the fact that the response time of the hydraulic system is fast, while aiming to assure a null static error between the desired and the output (dP=$P_{apply}$-$P_{release}$) pressure. The pre-filter uses the input dP and a line pressure $P_{LINE}$ to compute $P_{TCC}$ 86 by solving equation (3) provided $\dot{x}$=0. The mathematical model can be shown as:

$$P_{TCC} = \frac{\frac{x_1}{C_1} + F_0 + A_1 * P_{reg}}{Areg * coeffP_{LINE} \text{ correction}}. \tag{5}$$

Where $x_1$ is the position of the valve. $C_1$ is the capacity of the valve. $F_0$ is the nominal feedback force of the valve. $A_{reg}$ is the area of the valve on the input side. $A_1$ is the area of the valve on the output side. $P_{reg}$ is the regulated pressure that is output from the valve. coeffP$_{line}$correction is a line coefficient factor that compensates the difference between commanded and actual line pressure.

The converter control module 44 controls slip based on the first mechanical equation of the torque converter (equation 1). Substituting the following equation for pump torque $C_p$:

$$C_p = A*E_S^2 + B*E_S*T_S + C*T_S^2 \tag{6}$$

and the following equation for transmitted torque $C_t$:

$$C_t = dP*nAr*\mu(E_S, T_S), \tag{7}$$

the first mechanical equation becomes:

$$I_m * \frac{dE_S}{dt} = C_m + A*E_S^2 + B*E_S*T_S + C*T_S^2 - \mu(E_S, T_S)*nAr*dP. \tag{8}$$

Given the non-linearity of the mechanical system, two variable substitutions can be made based on the pump torque equation in order to obtain a linear system. Provided z=$E_S$-$E_{S1}$ where $E_{S1}$ and $E_{S2}$ are solutions of the pump torque equation (6) and u=1/z, the mathematical model becomes:

$$\frac{du}{dt} = -\frac{A}{I_m} - \frac{A}{I_m} * (E_{S1} - E_{S2}) * u + \frac{[\mu(E_S, T_S) * nAr * dP - C_m]}{I_m} * u^2. \quad (9)$$

Figure 7:
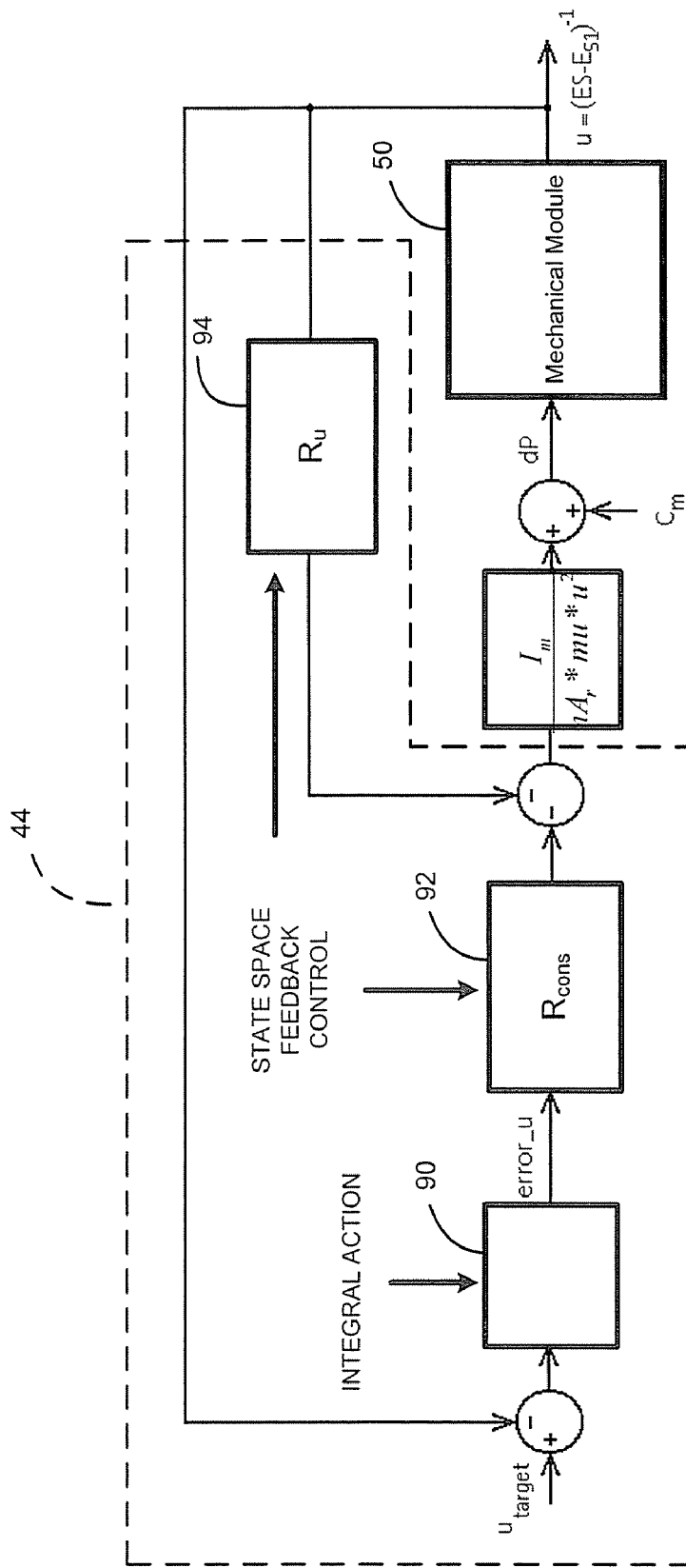
FIG. 7 is an exemplary model in Matlab form illustrating the converter control module.

In order to develop an efficient torque converter control method that is robust against variation of engine torque, a friction coefficient and/or pure delay, state space feedback control including an integral action is implemented. FIG. 7 is a Matlab model illustrating the torque converter control method. Slip error is calculated from a pre-determined target slip $U_{Target}$ 78 and a measured slip $U_{Slip}$ 80 that is output from the plant model 50. An integrator 90 applies an integration to slip error ($U_{Target}-U_{Slip}$). A TCC pressure is then determined from state space feedback matrices Rcons 92 representing a correction for the input order and Ru 94 representing a correction for the pressure command.

The mathematical models used to generate the torque converter control method are discussed below. The state space representation matrix of the torque converter is translated from a continuous time to a sampling time, using the following equations:

$$\text{Matrix} = M = -\frac{A}{I_m} * (E_{S1} - E_{S2}), \quad (10)$$

$$\Phi = e^{M*T_S}, \quad (11)$$

and $$\Gamma = \int_0^{T_S} e^{M*t} dt * B. \quad (12)$$

The matrix in sampling time can be defined as:

$$\Gamma = \frac{e^{M*T_S} - 1}{M}. \quad (13)$$

Where $T_S$ is the sampling time and not turbine speed.

Commanded pressure is determined using the state space feedback matrices and an integral action, where commanded pressure $P_{TCC}$ equals:

$$P_{TCC} = \text{Deptorq} + \text{retat\_action} + \text{intetat\_action} \quad (14)$$

Deptorq is defined as pressure that corrects changes in engine torque. Retat_action is defined as the pressure that corrects an error in the commanded pressure to reach the input target and is shown at 92. Intetat_action is defined as the pressure that ensures zero error in steady state conditions shown at 94.

The following mathematical model represents the pressure that corrects changes in engine torque Deptorq:

$$\text{Deptorq} = \frac{C_m}{nAr * \mu} \quad (15)$$

Where $C_m$ is engine torque. nAr is a coefficient comprising n number of clutches with a surface area A and a radius r. μ is a friction coefficient.

The following mathematical model represents the pressure that corrects an error in the commanded pressure ret_action:

$$\text{retat\_action} = \frac{I_m}{nAr * \mu} * r_u * (E_S - E_{S1}) \quad (16)$$

Where $I_m$ is engine inertia. nAr is a coefficient comprising n number of clutches with a surface area A and a radius r. μ is a friction coefficient. $R_u$ is a correction for the pressure command given by the state space feedback control. $E_s$ is engine speed. $E_{s1}$ is a first solution of the pump torque equation (equation 6).

The following mathematical model represents the pressure that ensures zero error in steady state conditions intetat_action:

$$\text{intetat\_action} = \frac{I_m}{nAr * \mu} * r_{cons} * \text{error\_u} * (E_S - E_{S1})^2. \quad (17)$$

Where $I_m$ is engine inertia. nAr is a coefficient comprising n number of clutches with a surface area A and a radius r. μ is a friction coefficient. Rcons is the correction to the input order. Error_u is a difference between a desired slip and a commanded slip. $E_s$ is engine speed. $E_{s1}$ is a first solution of the pump torque equation (equation 6).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A torque converter control simulation system, comprising:
    a controller simulator comprising:
    a converter control module that integrates a slip error and determines an apply pressure value and a release pressure value based on state space feedback control including said integrated slip error and received signals including an engine torque signal, an engine speed signal, a turbine speed signal, a target slip signal and a measured slip signal; and
    a hydraulic control module that determines a pressure signal based on said apply pressure and said release pressure; and
    a mechanical simulator comprising:
    a hydraulic module that simulates hydraulic flow of two main valves according to a solenoid signal and based on a state space representation of the solenoid and the valves; and
    a mechanical module that simulates the mechanical functions of a torque converter based on torque relationships within the torque converter.

2. The system of claim 1 wherein said converter control module determines said apply pressure and said release pressure based on computing a summation of an engine torque correction pressure, a commanded pressure correction pressure, and a steady state correction pressure.

3. The system of claim 2 wherein said engine torque correction pressure (Deptorq) is determined based on engine torque ($C_m$), a coefficient based on n number of clutches with a surface area A and a radius r (nAr), and a friction coefficient (μ).

4. A torque converter control simulation system, comprising:
- a controller simulator comprising:
- a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
- a hydraulic control module that determines a pressure signal based on said apply pressure and said release pressure; and
- a mechanical simulator comprising:
- a hydraulic module that simulates a hydraulic flow of two main valves according to a solenoid signal and based on a state space representation of the solenoid and the valves; and
- a mechanical module that simulates the mechanical functions of a torque converter based on torque relationships within the torque converter,
- wherein said engine torque correction pressure (Deptorq) is determined based on an engine torque ($C_m$), a coefficient based on n number of clutches with a surface area A and a radius r (nAr), and a friction coefficient ($\mu$) and where:

$$Deptorq = \frac{C_m}{nAr * \mu}.$$

5. A torque converter control simulation system, comprising:
- a controller simulator comprising:
- a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
- a hydraulic control module that determines a pressure signal based on said apply pressure and said release pressure; and
- a mechanical simulator comprising:
- a hydraulic module that simulates a hydraulic flow of two main valves according to a solenoid signal and based on a state space representation of the solenoid and the valves; and
- a mechanical module that simulates the mechanical functions of a torque converter based on torque relationships within the torque converter,
- wherein said converter control module determines said apply pressure and said release pressure based on computing a summation of an engine torque correction pressure, a commanded pressure correction pressure, and a steady state correction pressure, and
- wherein said commanded pressure correction (retat_action) is determined based on engine inertia ($I_m$), a coefficient based on n number of clutches with a surface area A and a radius r (nAr), a friction coefficient ($\mu$), a correction based on a state space feedback control matrix ($r_u$), engine speed ($E_S$), and a solution of pump torque ($E_{S1}$).

6. The system of claim 5 wherein said commanded pressure correction (retat_action) is determined based on:

$$\text{retat\_action} = \frac{I_m}{nAr * \mu} * r_u * (E_S - E_{S1}).$$

7. A torque converter control simulation system, comprising:
- a controller simulator comprising:
- a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
- a hydraulic control module that determines a pressure signal based on said apply pressure and said release pressure; and
- a mechanical simulator comprising:
- a hydraulic module that simulates a hydraulic flow of two main valves according to a solenoid signal and based on a state space representation of the solenoid and the valves; and
- a mechanical module that simulates the mechanical functions of a torque converter based on torque relationships within the torque converter,
- wherein said steady state correction pressure (intetat_action) is determined based on engine inertia ($I_m$), a coefficient based on n number of clutches with a surface area A and a radius r (nAr), and a friction coefficient ($\mu$), a correction based on a state space feedback control matrix ($r_{cons}$), a difference between target slip and measured slip (error_u), engine speed ($E_s$), and a first solution of pump torque ($E_{s1}$).

8. The system of claim 7 wherein said steady state correction pressure (intetat_action) is determined based on:

$$\text{intetat\_action} = \frac{I_m}{nAr * \mu} * r_{cons} * \text{error\_u} * (E_S - E_{S1})^2.$$

9. A torque converter control simulation system, comprising:
- a controller simulator comprising:
- a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
- a hydraulic control module that determines a pressure signal based on said apply pressure and said release pressure; and
- a mechanical simulator comprising:
- a hydraulic module that simulates a hydraulic flow of two main valves according to a solenoid signal and based on a state space representation of the solenoid and the valves; and
- a mechanical module that simulates the mechanical functions of a torque converter based on torque relationships within the torque converter,
- wherein said hydraulic control module determines said pressure signal $P_{TCC}$ based on a position of a valve that supplies said pressure ($x_1$), a capacity of the valve ($C_1$), a nominal feedback force of the valve ($F_0$), an area of the valve on an input side ($A_{reg}$), an area of the valve on an output side ($A_1$), a pressure that is output from the valve ($P_{reg}$), and a coefficient factor that compensates a difference between a commanded pressure and an actual line pressure (coeffP$_{line}$correction).

10. The system of claim 9 wherein said hydraulic control module determines said pressure signal P$_{TCC}$ based on:

$$P_{TCC} = \frac{\frac{x_1}{C_1} + F_0 + A_1 * P_{reg}}{Areg * coeffP_{LINE}\ \text{correction}}.$$

11. A torque converter control simulation system, comprising:
 a controller simulator comprising:
 a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
 a hydraulic control module that determines a pressure signal based on said apply pressure and said release pressure; and
 a mechanical simulator comprising:
 a hydraulic module that simulates a hydraulic flow of two main valves according to a solenoid signal and based on a state space representation of the solenoid and the valves; and
 a mechanical module that simulates the mechanical functions of a torque converter based on torque relationships within the torque converter,
 wherein said hydraulic module simulates hydraulic flow from a state space representation of a bond graph wherein x represents a system state vector, u represents an input vector and y represents an output vector, coefficients A and B, and $\dot{x}=A.x+B.u$ y=C.x.

12. A torque converter control simulation system, comprising:
 a controller simulator comprising:
 a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
 a hydraulic control module that determines a pressure signal based on said apply pressure and said release pressure; and
 a mechanical simulator comprising:
 a hydraulic module that simulates a hydraulic flow of two main valves according to a solenoid signal and based on a state space representation of the solenoid and the valves; and
 a mechanical module that simulates the mechanical functions of a torque converter based on torque relationships within the torque converter,
 wherein the mechanical module simulates the mechanical functions based on engine inertia ($I_m$), a change in engine speed $$\left(\frac{dE_S}{dt}\right),$$

engine torque ($C_m$), pump torque ($C_p$), transmitted torque ($C_t$), and a torque converter equation:

$$I_m \cdot \frac{dE_S}{dt} = C_m - C_p - C_t.$$

13. A torque converter control simulation system, comprising:
 a controller simulator comprising:
 a converter control module that integrates a slip error and determines an apply pressure value and a release pressure value for a torque converter clutch based on state space feedback control including said integrated slip error and received signals including an engine torque signal, an engine speed signal, a turbine speed signal, a target slip signal and a measured slip signal; and
 a hydraulic control module that determines a pressure signal based on said apply pressure and said release pressure; and
 a mechanical simulator comprising:
 a hydraulic module that simulates a hydraulic flow of two main valves according to a solenoid signal and based on a state space representation of the solenoid and the valves; and
 a mechanical module that simulates the mechanical functions of a torque converter based on torque relationships within the torque converter,
 wherein the mechanical module simulates the mechanical functions based on torque converter inertia ($I_{conv}$), a change in turbine speed $$\left(\frac{dT_S}{dt}\right),$$

turbine torque ($C_T$), transmitted torque ($C_t$), and a torque converter equation:

$$I_{conv.} \frac{dT_S}{dt} = C_t + C_T.$$

* * * * *